United States Patent [19]

Kamo et al.

[11] Patent Number: 5,235,481
[45] Date of Patent: Aug. 10, 1993

[54] MAGNETIC DISK DRIVE HAVING A CARTRIDGE WITH ACTUATOR AND SPINDLE

[75] Inventors: Masayoshi Kamo; Kenji Shoji; Junji Kawada, all of Kamakura, Japan

[73] Assignee: Mitsubishi Denki Kabushiki Kaisha, Japan

[21] Appl. No.: 787,015

[22] Filed: Nov. 4, 1991

[30] Foreign Application Priority Data

Dec. 13, 1990 [JP] Japan ................... 2-401886

[51] Int. Cl.⁵ ............... G11B 5/012; G11B 17/04; G11B 5/55; G11B 23/03
[52] U.S. Cl. ............... 360/97.01; 360/99.06; 360/99.08; 360/106; 360/133
[58] Field of Search ............. 360/97.01, 98.04, 98.05, 360/98.06, 99.06, 99.07, 133, 99.08, 106

[56] References Cited

U.S. PATENT DOCUMENTS

| | | | |
|---|---|---|---|
| 4,064,545 | 12/1977 | Goss | 360/133 |
| 4,359,762 | 11/1982 | Stollorz | 360/133 |
| 4,474,103 | 1/1990 | Iftikar et al. | 360/99.08 |
| 4,965,691 | 10/1990 | Iftikar et al. | 360/99.08 |
| 5,113,297 | 5/1992 | Yoshida | 360/97.01 |
| 5,140,478 | 8/1992 | Yoshida | 360/97.01 |
| 5,175,657 | 12/1992 | Iftikar et al. | 360/97.01 |

Primary Examiner—Stuart S. Levy
Assistant Examiner—Craig A. Renner
Attorney, Agent, or Firm—Wolf, Greenfield & Sacks

[57] ABSTRACT

A magnetic disk drive. A cartridge for accommodating a magnetic recording medium also accommodates an actuator and a spindle. The spindle accommodated in the cartridge is driven by a spindle driving mechanism provided in a driving device so as to rotate the magnetic recording medium. The actuator is driven by an actuator driving mechanism provided in the driving device so as to move a magnetic head approximately in the radial direction of the magnetic recording medium. The cartridge includes a shutter mechanism which is opened so as to expose at least a part of the spindle and the actuator in such a manner as to face the actuator driving mechanism and the spindle driving mechanism, respectively, when the cartridge is mounted on the driving device and which is closed so as to enclose the spindle and the magnetic head and the actuator in the cartridge in a sealed state when the cartridge is removed from the driving device. The cartridge further includes a ramp loading mechanism for protecting the magnetic head from an external shock when the cartridge is removed from the driving device.

19 Claims, 11 Drawing Sheets

MAGNETIC DISK DRIVE HAVING A CARTRIDGE WITH ACTUATOR AND SPINDLE

BACKGROUND OF THE INVENTION

1. Field of the Invention

The present invention relates to a magnetic disk drive which is used as an external storage unit of a computer.

2. Description of the Related Art

Figure 8:
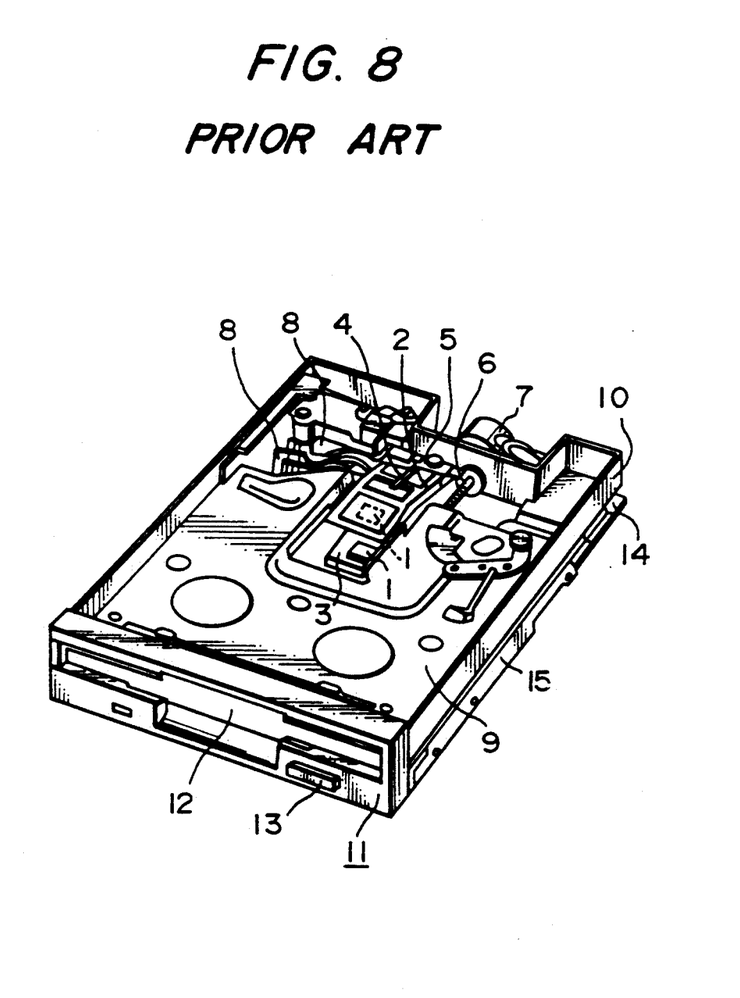
FIG. 8 is a perspective view of the conventional magnetic disk drive.

FIG. 8 is a perspective view of an example of a conventional magnetic disk apparatuses, which is shown in a catalogue of a microfloppy disk drive (3.5-inch flexible disk drive: MP-F11W) produced by SONY Corporation. This is a very general 3.5-inch flexible disk device (hereinunder referred to as "FDD"). In FIG. 8, the reference numeral 1 represents a magnetic head, 2 an arm to which the magnetic head 1 is fixed such that the magnetic head 1 exists within a predetermined azimuth, 3 a carriage to which the magnetic head 1 on the opposite side is fixed such that the magnetic head 1 exists within a predetermined azimuth, 4 a pressure spring for applying a predetermined pressure to the magnetic head 1 through the arm 2, 5 a metal fitting for fixing the pressure spring 4 to the carriage 3, 6 a lead screw which axially rotates and induces the linear reciprocal movements of the carriage 3, 7 a stepping motor for applying a driving force to the lead screw 6, and 8 a flexible printed circuit (hereinunder referred to as "FPC").

Figure 9:
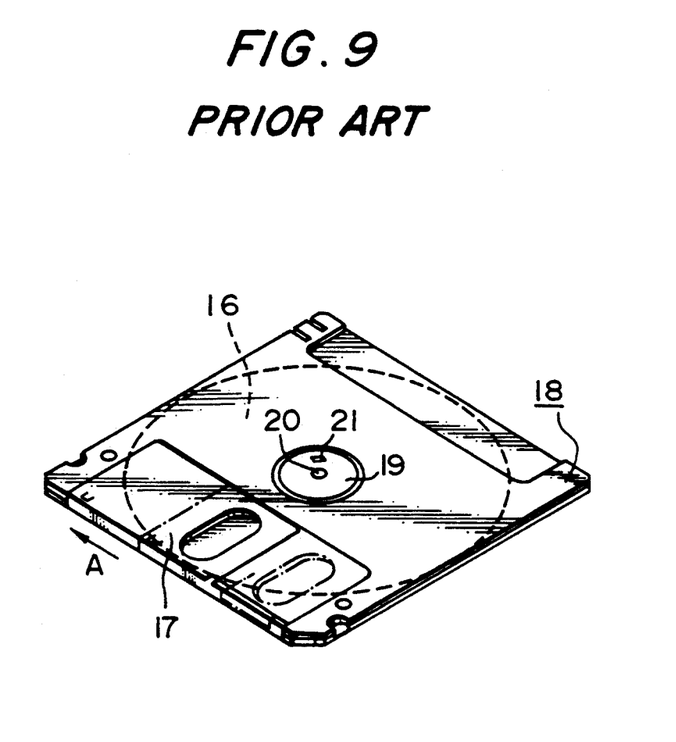
FIG. 9 is a perspective view of the cartridge in the conventional magnetic disk drive.

The reference numeral 9 denotes a loading mechanism having a function of mounting and removing a cartridge which is shown in FIG. 9, 10 a base to which various structures are fixed so as to be accommodated therein, 11 a front panel which is attached to the front surface of the disk drive, 12 a door provided on the front panel 11 so as to be opened and closed when the cartridge 18 is mounted or removed, 13 a push button which is pressed into the apparatus or released coupled with the movement of the loading mechanism 9, 14 a printed circuit board which is fixed to the bottom portion of the base 10, and 15 a mounting frame for mounting the drive on a system such as a personal computer.

FIG. 9 is a perspective view of the cartridge 18. The reference numeral 16 represents a flexible recording medium on and from which information is written or read by the magnetic heads 1, 17 a shutter which is opened or closed coupled with the movement of the loading mechanism 9 so as to expose or cover the portion of the recording medium 16 with which the magnetic head 1 comes into contact, 19 a chucking plate magnetically attracted to the rotary portion of a spindle motor (not shown) which is provided in the disk drive shown in FIG. 8, 20 a center hole for receiving the centering shaft of the spindle motor and 21 a driving hole into which the driving pin of the spindle motor is inserted and to which the driving force is transmitted.

Figure 10:
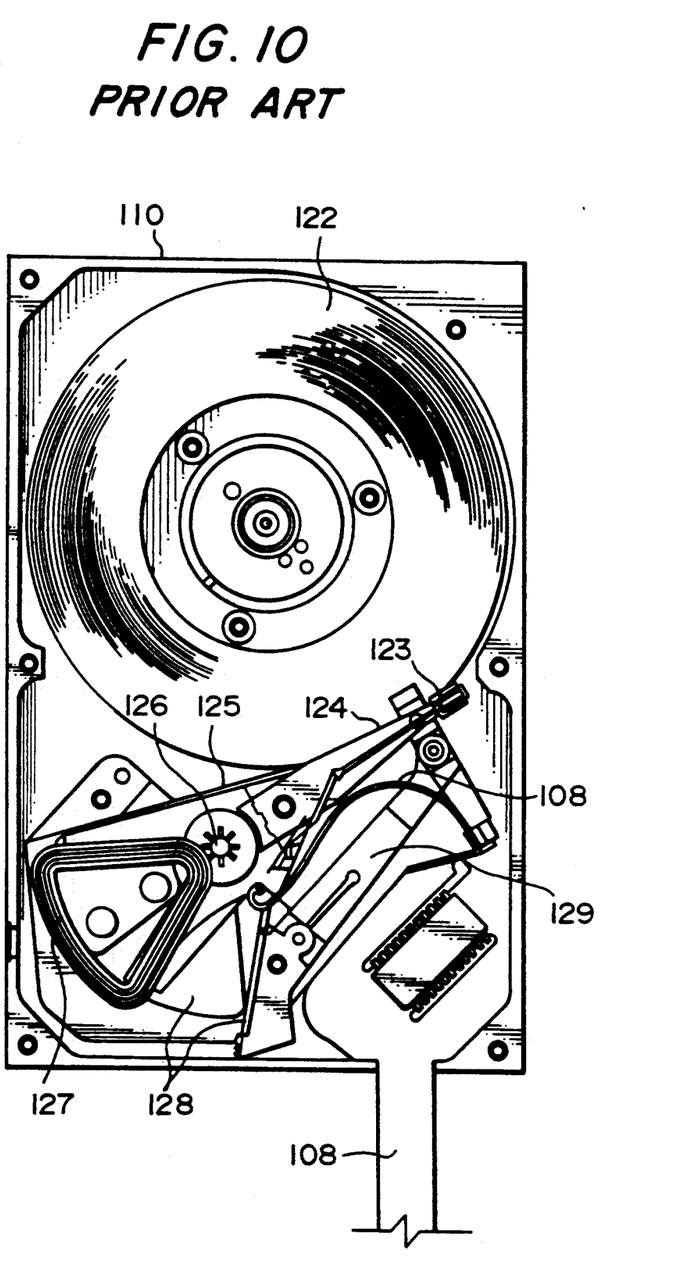
FIG. 10 is a plan view of another conventional magnetic disk drive.

FIG. 10 is a plan view of another conventional magnetic disk drive shown in International Publication No. WO89/08313. This is a typical 2.5-inch fixed disk drive. In FIG. 10, the reference numeral 108 represents an FPC, 110 a base, 122 a hard recording medium using an aluminum alloy as a base material, 123 a magnetic head for writing and reading information while floating above the recording medium 122 with a minute space therebetween, 124 a suspension made of an SUS spring material which is pivotally supported by the upper portion of the magnetic head 123, 125 an actuator to which the suspension 124 is fixed and which rocks the magnetic head 123 approximately in the radial direction above the recording medium 122, 126 a pivot as the center axis of the rocking movement of the actuator 125, 127 a coil bobbin which is fixed to the actuator 125 at the end opposite to the end to which the suspension 124 is fixed, 128 a magnet which vertically sandwiches the coil bobbin 127 with a minute space therebetween, and 129 a ramp loading mechanism which comes into contact with the suspension 124 and holds the magnetic head 123 with a predetermined distance from the recording medium 122 when the magnetic head 123 moves outside of the recording medium 122.

Figure 11A:
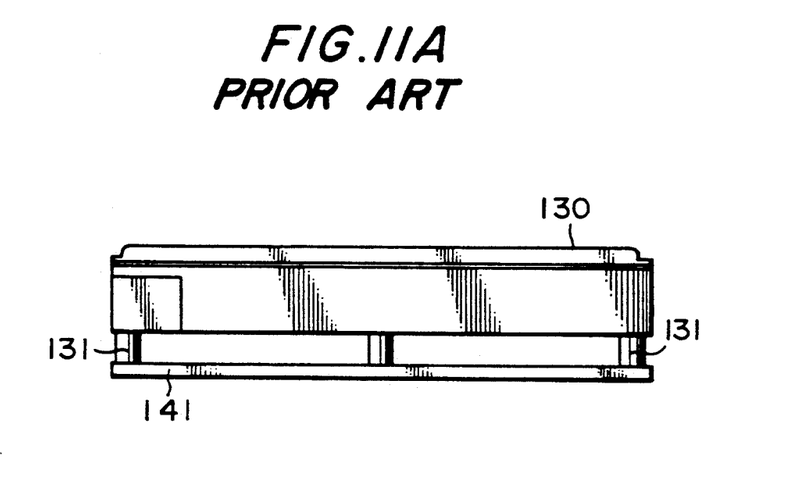
FIG. 11A is a side elevational view of the conventional magnetic disk drive shown in FIG. 10.
Figure 11B:
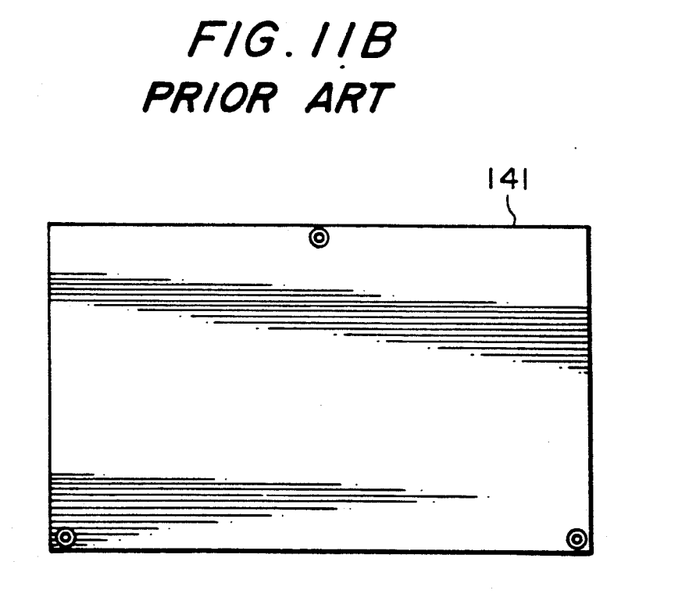
FIG. 11B is a plan view of the circuit printed board in the conventional magnetic disk drive shown in FIG. 10.

FIG. 11A is a side elevational view of the disk drive shown in FIG. 10. The reference numeral 141 represents a printed circuit board, 130 a cover which is bonded to the base 110 shown in FIG. 10 so as to seal the disk drive, and 131 a rubber cushion which is attached to the bottom surface of the base 110 so as to mitigate the vibration and the shock of the disk drive.

The operations of these conventional magnetic disk drives will now be explained. An FDD, which is the conventional magnetic disk drive shown in FIG. 8, will first be explained. When the cartridge 18 shown in FIG. 9 is inserted from the door 12 of the front panel 11, the shutter 17 is slid in the direction indicated by the arrow A in FIG. 9 by the loading mechanism 9, thereby exposing the portion with which the magnetic head 1 comes into contact. At the same time, the chucking plate 19 is attracted to the spindle chucking surface by the magnetic force of a magnet provided on the spindle chucking surface.

The push button 13 projects coupled with the movement of the loading mechanism 9. The arm 2 is pushed down by the pressure spring 4 and the magnetic head 1 fixed on the arm 2 comes into contact with the recording medium 16, whereby the recording medium 16 is sandwiched between the magnetic head 1 fixed on the arm and the magnetic head 1 fixed on the carriage 3. When the recording medium 16 is normally chucked, the spindle motor starts to rotate, and the driving pin of the spindle motor comes into the driving hole 21 provided in the chucking plate 19, so that the recording medium 16 also rotates. The rotation of the stepping motor 7 is transmitted to the carriage 3 through the lead screw 6 and the carriage 3 linearly reciprocates by the distance which is proportional to the rotational angle of the stepping motor 7, so that the magnetic head 1 is positioned at the desired track position of the recording medium 16 in accordance with the command from the system.

When the positioning of the magnetic head 1 is finished, the magnetic head 1 starts to write or read information on or from the magnetic recording medium 16. When the user presses the push button 13 in order to take out the cartridge 18 after the end of the writing/reading of necessary information, the loading mechanism 9 operates the other way around. That is, the arm 2 is pushed up, and the cartridge 18 is pushed out of the door 12 of the front panel 11. This FDD operates in the same way with respect to any other recording medium 16. In addition, in order to enable the recording medium 16 to operate normally in any other disk drive, namely, to impart compatibility between drives to the recording medium 16, the magnetic head 1 is fixed to the arm 2 within a predetermined azimuth in any disk drive.

The operation of a fixed disk drive (HDD), which is the other conventional magnetic disk drive shown in FIG. 10, will now be explained. The hard recording medium 122 produced by applying, plating or sputtering a magnetic material on a base of an aluminum alloy is rotated at a high speed, and the magnetic head 123 is positioned at the desired track of the recording medium 122 in accordance with the command from the system while floating thereabove at a minute height of the submicron order for writing or reading information. At this time, the actuator 125 for moving the magnetic head 123 is rocked around the pivot 126 by the rotational force produced by the electromagnetic induction between the magnet 128 and the coil bobbin 127. In this way, since the structure composed of the magnetic head 123, the suspension 124, the actuator 125 and the coil bobbin 127 has the center of the moment of inertia in the vicinity of the pivot 126 and the magnetic head 123 is floating above the recording medium 122, the frictional resistance is small. In addition, since a ball bearing is used for the pivot 126, the rotational frictional resistance is small. For these reasons, it is possible to rock the magnetic head 123 at a high speed.

In this HDD, it is possible to slightly move and position the magnetic head 123 by the servo information which is written in the recording medium 122 in advance and the function of the printed circuit board 141. As a result, it is possible to increase the number of tracks, thereby realizing high-density high-capacity recording. In addition, when the magnetic head 123 is not used for writing/reading for a long time or when the power source is off, the actuator 125 is moved to the outer peripheral side and the suspension 124 is mounted on the ramp loading mechanism 129, thereby keeping the magnetic head 123 at a predetermined position outside of the recording medium 122.

In this way, it is possible to reduce the consumption power and prevent the recording medium 122 from being damaged due to the tapping of the magnetic head 123 on the recording medium 122 while the disk drive is not operated. As described above, since the magnetic head 123 floats above the recording medium 122 at a height of the submicron order, it is necessary to prevent the ingress of dust from the outside in order to realize accurate operation of the apparatus. For this purpose, the cover 130 is bonded to the base 110 through a gasket so as to seal the disk drive.

An FDD as a conventional magnetic disk drive in which a recording medium is replaceable has the above-described structure. Such an FDD must be free from the non-uniformity in the chucking accuracy at which a recording medium is chucked by the spindle and the non-uniformity in the rotational accuracy due to the non-uniformity in the chucking accuracy so as to write and read information on and from any recording medium in the same way. For this reason, the FDD must have a compatibility between recording mediums and impart a compatibility between drives to a recording medium. If these demands are satisfied, the increase in the recording density is checked and it is difficult to reduce the size of the disk drive in spite of a small capacity. In addition, since the disk drive does not have a sealed structure so as to make a recording medium replaceable, the dust which has entered the apparatus goes between the magnetic head and the recording medium and damages the recording medium or adheres to the driving mechanism such as the lead screw, thereby deteriorating the positioning accuracy and lowering the reliability.

On the other hand, the fixed disk drive as another conventional magnetic disk drive can have a sealed structure because the recording medium is not replaceable. However, various elements such as a spindle motor driving mechanism and an actuator driving mechanism are accommodated in the sealed container, the disk drive as a whole becomes inconveniently large.

SUMMARY OF THE INVENTION

Accordingly, it is an object of the present invention to solve the above-described problems in the related art and to provide a magnetic disk drive which allows the replacement of a recording medium, which has high reliability and which enables reduction in size and cost.

To achieve this end, a magnetic disk drive according to the present invention fundamentally has the following structure. A magnetic disk drive comprises:

A) a cartridge including:

a) a planar magnetic recording medium;

b) a spindle fixed to the central part of the magnetic recording medium;

c) a magnetic head which is fixed to an actuator and which magnetically writes information on the magnetic recording medium and reads the information written on the magnetic recording medium;

d) the actuator which supports the magnetic head at one end thereof and which rocks around the pivot in a plane parallel to the recording surface of the recording medium; and e) a shutter mechanism which is closed so as to accommodate the magnetic recording medium, spindle, magnetic head and actuator in the cartridge in a sealed state and which is opened so as to expose at least a part of the spindle and the actuator; and B) a driving device including:

f) a loading mechanism for mounting the cartridge on the driving device while opening the shutter mechanism and for removing the cartridge while closing the shutter mechanism;

g) a spindle driving mechanism for rotating the magnetic recording medium by rotating the spindle in the state in which the cartridge is mounted; and h) an actuator driving mechanism for moving the position of the magnetic head by rocking the actuator in the state in which the cartridge is mounted.

In this structure, the loading mechanism opens and closes the shutter mechanism when the cartridge is mounted on the driving device and removed therefrom, respectively. The loading mechanism opens the shutter mechanism when the cartridge is mounted on the driving device and exposes at least a part of the actuator and the spindle in the cartridge. In this state, the spindle driving mechanism and the actuator mechanism drive the spindle and the actuator, respectively. When the spindle is driven, the magnetic recording medium rotates and when the actuator is driven, the magnetic head is positioned. In this state, it is possible to write desired information at a given position on the magnetic recording medium by the magnetic head or to read from a given position on the recording medium by the magnetic head the information written at that position. On the other hand, when the cartridge is removed from the driving device by the loading mechanism, the loading mechanism closes the shutter mechanism. In other words, the cartridge assumes a sealed state.

In this way, according to the present invention, a small-sized magnetic disk drive which has higher reliability and a higher recording density is realized at a low cost while maintaining ease in handling. These advantages are ascribed to the fact that since the spindle is accommodated in the cartridge, the non-uniformity in the chucking accuracy of the spindle is suppressed, that since the magnetic head is accommodated in the cartridge, the azimuth error is suppressed, that since the cartridge has a sealed structure, the cartridge is unsusceptible to dust and the recording density is enhanced, and that since the number of elements which are to be disposed in the cartridge in a sealed state is small, it is possible to reduce the size of the cartridge.

If a magnetic disk drive according to the present invention has the following structure, the shock resistance of the cartridge in the state of being removed from the driving device is enhanced. Such a disk drive comprises:

A) a cartridge including:
 a) a planar magnetic recording medium;
 b) a spindle fixed to the central part of the magnetic recording medium;
 c) a magnetic head which is fixed to an actuator through a suspension and which magnetically writes information on the magnetic recording medium and reads the information written on the magnetic recording medium; the suspension being a leaf spring with one end being fixed to the actuator and the other end supporting the magnetic head in such a manner as to enable the magnetic head to be pushed up vertically relative to the actuator;
 d) the actuator which supports the magnetic head at one end thereof and which rocks around the pivot in a plane parallel to the recording surface of the recording medium;
 e) a shutter mechanism which is closed so as to accommodate the magnetic recording medium, spindle, magnetic head and actuator in the cartridge in a sealed state and which is opened so as to expose at least a part of the spindle and the actuator;
 f) a means for moving the magnetic head outside of the recording surface of the magnetic recording medium in a plane which is parallel to the recording surface of the magnetic recording medium by rotating the actuator when the shutter mechanism is closed;
 g) a retracting cam for pushing up the suspension when the shutter is closed; and
 h) a ramp loading mechanism for receiving the suspension and holding the vertical position of magnetic head when the magnetic head moves outside of the recording surface of the magnetic recording medium and the suspension is pushed up; and B) a driving device including:
 i) a loading mechanism for mounting the cartridge on the driving device while opening the shutter mechanism and for removing the cartridge while closing the shutter mechanism;
 j) a spindle driving mechanism for rotating the magnetic recording medium by rotating the spindle in the state in which the cartridge is mounted; and
 k) an actuator driving mechanism for moving the position of the magnetic head by rocking the actuator in the state in which the cartridge is mounted.

In this structure, when the cartridge is removed from the driving device, the shutter mechanism is closed and the suspension is mounted on the ramp loading mechanism. In this state, the position of the magnetic head is approximately fixed, so that the cartridge has a sufficient resistance to a shock which may be applied thereto from the outside. Accordingly, although the cartridge accommodates a part (e.g., the actuator, spindle) of the driving mechanism, which are precision machines generally susceptible to an external shock, the cartridge is easy to handle.

The actuator and the actuator driving mechanism may be coupled either in a contacting state or in a non-contacting state. In order to couple them in a non-contacting state, a coil and a magnet are used. That is, the actuator is driven through a magnetic field generated between the actuator and the actuator driving mechanism in correspondence with the operation of the actuator driving mechanism. On the other hand, in order to couple them in a contacting state, a turntable is used. For example, a magnetic disk drive according to the present invention with the actuator and the actuator driving mechanism coupled in a contacting state comprises:

A) a cartridge including:
 a) a planar magnetic recording medium;
 b) a spindle fixed to the central part of the magnetic recording medium;
 c) a magnetic head which is fixed to an actuator and which magnetically writes information on the magnetic recording medium and reads the information written on the magnetic recording medium;
 d) the actuator which supports the magnetic head at one end thereof and which rocks around the pivot in a plane parallel to the recording surface of the recording medium;
 e) a shutter mechanism which is closed so as to accommodate the magnetic recording medium, spindle, magnetic head and actuator in the apparatus in a sealed state and which is opened so as to expose at least the spindle and the pivot; and
 f) an elastic thin-film seal which is an annular member composed of a plurality of scale-like pieces so as to cover the peripheral edge of the exposed pivot, which is deformed by the rotational force around the pivot and which absorbs the rotational force by the deformation and seals at least the peripheral edge of the exposed pivot; and B) a driving device including:
 g) a loading mechanism for mounting the cartridge on the driving device while opening the shutter mechanism and for removing the cartridge while closing the shutter mechanism;
 h) a spindle driving mechanism for rotating the magnetic recording medium by rotating the spindle in the state in which the cartridge is mounted;
 i) an actuator driving mechanism for moving the position of the magnetic head by rocking the actuator in the state in which the cartridge is mounted;
 j) a turntable opposed to one end of the pivot in such a manner as to seal the exposed pivot in the axial direction when the cartridge is mounted on the driving mechanism and the shutter mechanism is open; and
 k) a coupling member engaged with the turntable so as to transmit the rotational force of the actuator driving mechanism and rotate the turntable.

In this structure, when the actuator is driven, the driving force is transmitted to the coupling member, the turntable and the actuator in that order and, as a result, the magnetic head is rocked. The elastic thin-film seal deforms in accordance with the rotational operation of the turntable and protects the vicinity of the contacting portion between the turntable and the actuator.

The fundamental or typical structure of the present invention has been explained above. The present invention may further have the following additional structure.

If the shutter mechanism is composed of a magnetic shielding material, noise is unlikely to enter the members in the cartridge through the shutter mechanism. If the surface of the cartridge except the surface which faces the spindle driving mechanism and the actuator driving mechanism is covered with a magnetic shielding material, the resistance to noise is also improved. Furthermore, if a means is provided for covering the surface of the cartridge which faces the spindle driving mechanism and the actuator driving mechanism with a nonmagnetic material when the shutter mechanism is closed, the magnetic coupling which is necessary between the cartridge and the driving device is enhanced, which contributes to the realization of reduction in size and enhancement of reliability. If a connecting mechanism such as a connector is provided both on the cartridge and on the driving device, the mounting and removal of the cartridge on and from the driving device are facilitated. If a buffer material is disposed on the outer peripheral portion of the cartridge, the ingress of dust is prevented and the shock resistance is improved, which realizes greater reduction in size and enhancement of reliability.

The above and other objects, features and advantages of the present invention will become clear from the following description of the preferred embodiments thereof, taken in conjunction with the accompanying drawings.

DESCRIPTION OF THE PREFERRED EMBODIMENTS

An embodiment of the present invention will be explained hereinunder with reference to the accompanying drawings.

Figure 1:
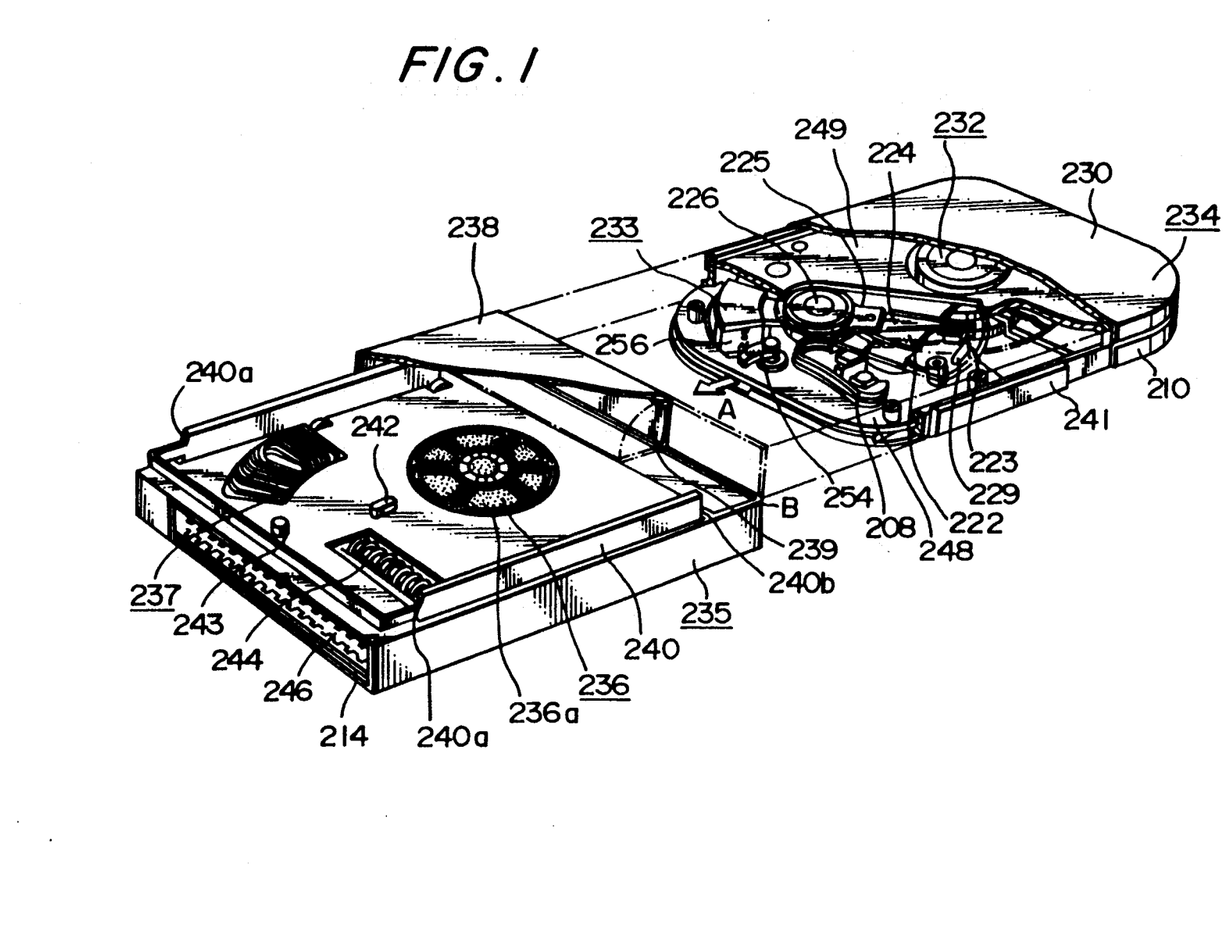
FIG. 1 is perspective view of an embodiment of a magnetic disk drive according to the present invention.

FIG. 1 is a perspective view of an embodiment of the present invention. The reference numeral 232 represents a spindle on which a recording medium 222 of substantially not more than 2.5 inches mounted and which rotates with high accuracy, 233 a moving magnet fixed to one end of an actuator 225 which is opposite to the end at which a suspension 224 is fixed, and 234 a cartridge composed of a cover 230 and a base 210 and accommodating various elements therein. The cartridge 234 has a height of about less than 10 mm, a width of about less than 70 mm and a length of about less than 106 mm. The reference numeral 235 denotes a driving device into which the cartridge 234 is integrally inserted, and 236 a spindle motor driving mechanism which is composed of a plurality of flat coils 236a and which is disposed in the driving device 235 at the position which opposes the bottom portion of the spindle 232.

The reference numeral 237 represents an actuator driving mechanism disposed in the driving device 235 at the position which opposes the bottom portion of the actuator 225, 238 a slot cover for covering the upper portion of the driving device 235 in the state in which the cartridge 234 is inserted thereinto, 239 a slot door provided at one end of the slot cover 238 so as to be opened and closed when the cartridge 234 is inserted or removed, 240 a loading mechanism provided in the driving device 235 so as to mount and remove the cartridge 234 on and from the driving device 235, 240a an L-shaped end portion of the loading mechanism 240, 240b the other end portion of the loading mechanism 240, and 241 a shutter mechanism which is composed of a magnetic shielding material and which slides so as to expose or cover the bottom portion of the actuator 225 and the bottom portion of the spindle 232 coupled with the operation of mounting or removing the cartridge 234.

The reference numeral 242 represents a positioning pin A provided on the driving device 235 so as to determine the position of the cartridge 234 when the cartridge 234 is inserted, 243 a positioning pin B provided on the driving device 235 similarly to the positioning pin A 242, and 244 a connector A which is provided in the driving device 235 so as to come into contact with a connector B 245 (shown in FIG. 3A) in electric conduction which is provided on the bottom portion of the cartridge 234 in electrical connection with an FPC 208 which transmits a signal of a magnetic head 223.

Figure 3A:
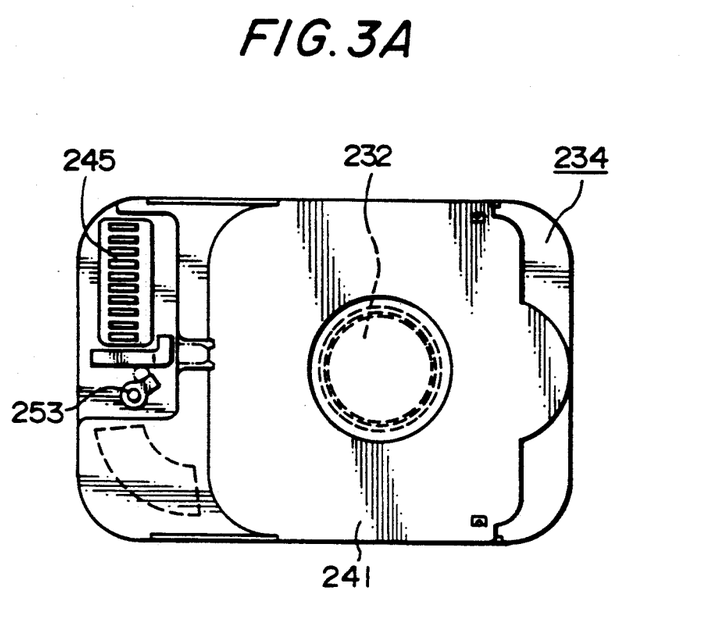
FIG. 3A is a plan view of the bottom of the cartridge in the embodiment shown in FIG. 1, in the state in which the shutter mechanism is open.

The reference numeral 246 represents a system connector which is attached to a printed circuit board 214 at one end of the driving device 235 so as to connect the driving device 235 to the system. In FIG. 3A, the reference numeral 253 denotes a retracting cam A which is provided on the bottom surface of the cartridge 234 and which is rotated by means of a spring or the like. The reference numeral 254 in FIG. 1 represents a retracting cam B which is provided in the cartridge 234 and which has the same rotational shaft as the retracting cam A 253. The reference numeral 226 denotes a pivot and 229 a ramp loading mechanism.

Figure 2A:
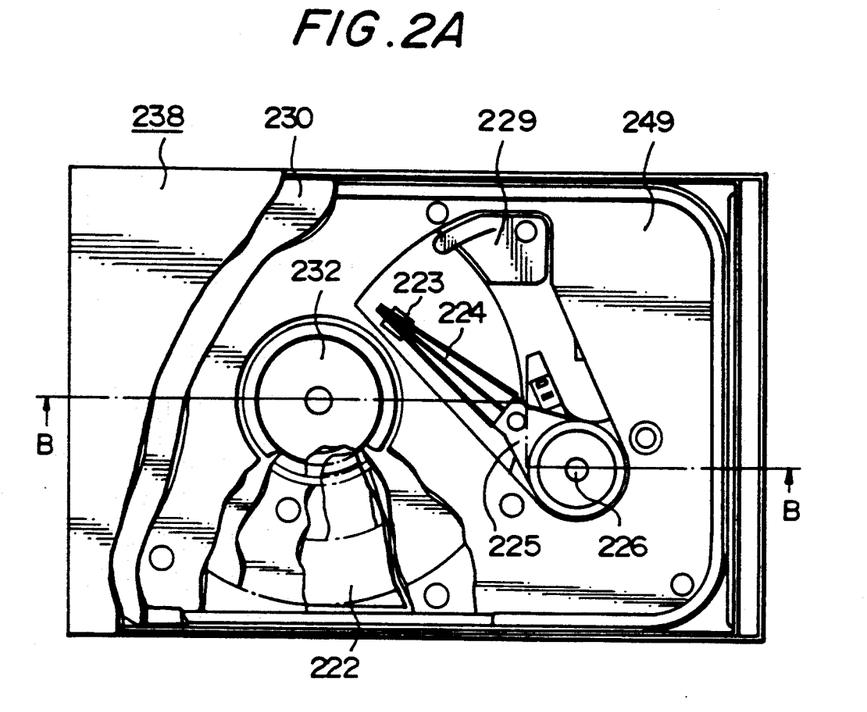
FIG. 2A is a plan view of the embodiment shown in FIG. 1.
Figure 2B:
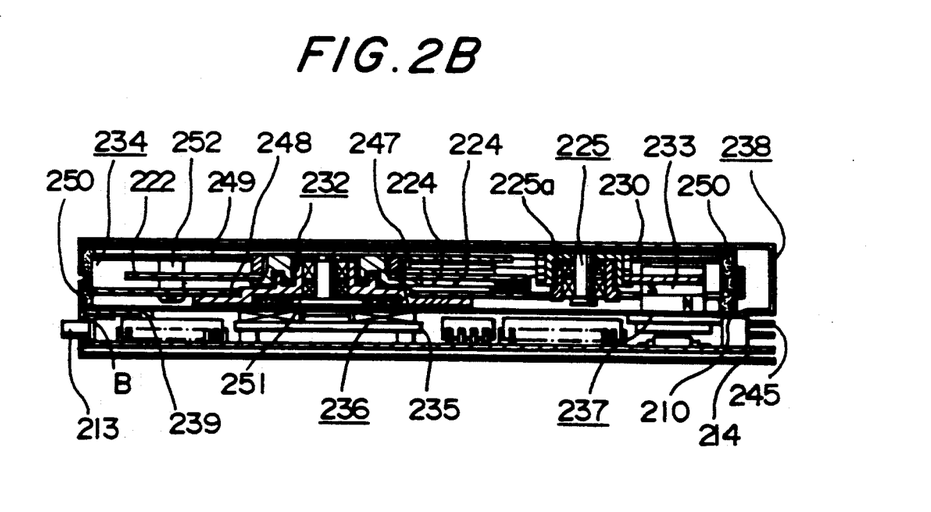
FIG. 2B is a B—B sectional side elevational view of the embodiment shown in FIG. 2A.

FIG. 2A is a plan view of the embodiment shown in FIG. 1 in the state in which the cartridge 234 is integrally inserted into the driving device 235 and FIG. 2B is a sectional side elevational view thereof. In FIGS. 2A and 2B, the reference numeral 247 represents a spindle housing which constitutes a bearing of the spindle 232, 248 a subbase to which the spindle housing 247 and a bearing portion 225a of the actuator 225 are fixed, 249 a subplate to which the subbase 248 is fixed through a column 252, 250 a buffer material with which the gap between the subbase and the inner wall of the cartridge 234 and the gap between the subplate 249 and the inner wall of the cartridge 234 are filled.

Figure 3B:
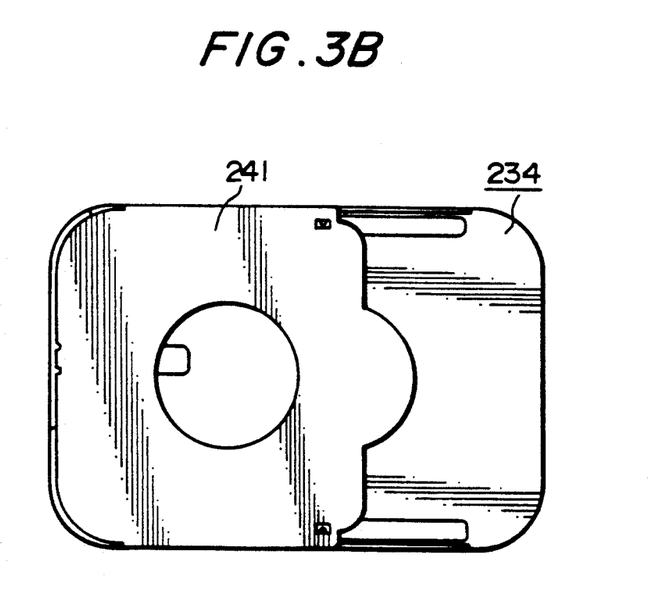
FIG. 3B is a plan view of the bottom of the cartridge of the embodiment shown in FIG. 1, in the state in which the shutter mechanism is closed.
Figure 4:
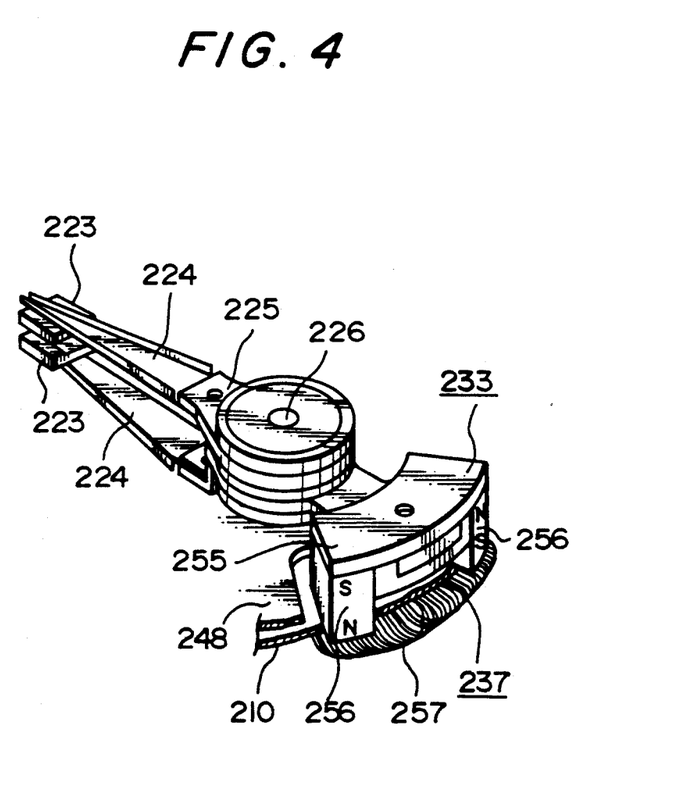
FIG. 4 is a perspective view of the actuator in the embodiment shown in FIG. 1.
Figure 5A:
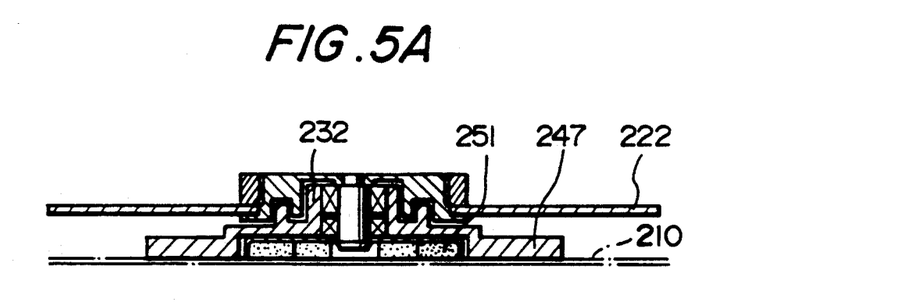
FIGS. 5A and 5B are a sectional side elevational view and a plan view, respectively, of the spindle in the embodiment shown in FIG. 1.
Figure 5B:
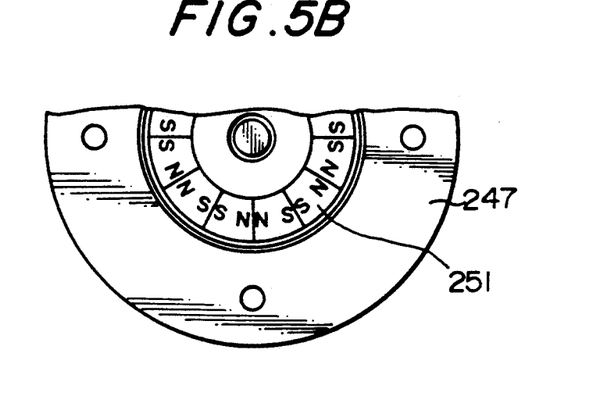
Figure 5C:
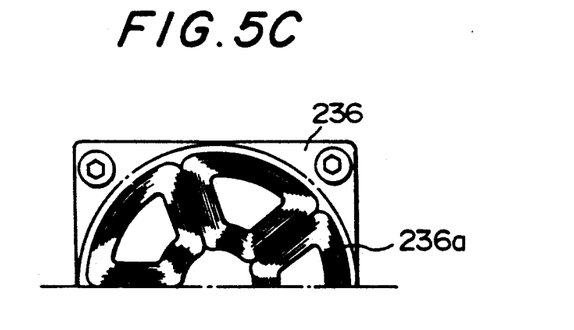
FIGS. 5C and 5D are a sectional side elevational view and a plan view, respectively, of the spindle driving mechanism in the embodiment shown in FIG. 1.
Figure 5D:
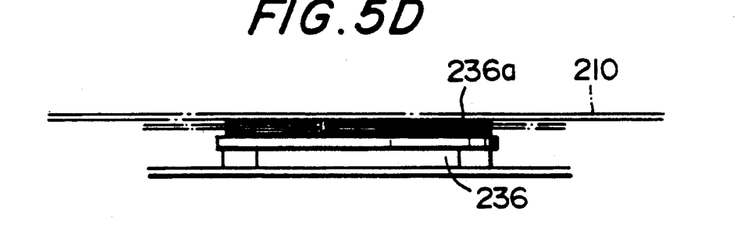

The reference numeral 251 represents a rotor which constitutes the bottom portion of the spindle 232. The rotor 251 is composed of a magnet which has a plurality of magnetic poles in the circumferential direction in correspondence with number of the flat coils 236a of the spindle driving mechanism 236. The reference numeral 255 in FIG. 4 denotes a yoke which constitutes the moving magnet 233, 256 a pair of magnets fixed to both ends of the yoke 255, and 257 a coil wound around the actuator driving mechanism 237 in a flat shape. The reference numeral 213 represents a push button and 223 the magnetic head in FIGS. 2A and 2B. FIGS. 3A and 3B show the cartridge 234 and FIG. 4 shows the structure of the actuator 225 and the vicinity thereof. FIGS. 5A to 5D show the structure of the spindle 232, the spindle motor driving mechanism and the vicinity thereof.

The operation of this magnetic disk drive will now be explained. When the user pushes the cartridge 234 into the slot cover 238 while pressing the cartridge 234 against the slot door 239 in the direction indicated by the arrow A in FIG. 1, the slot door 239 swivels inwardly and downwardly around the axis B to clear the entrance. The cartridge 234 is then inserted into the slot cover 238 along the L-shaped end portions 240a of the loading mechanism 240 with the slot door 239 pressed under the cartridge 234 until the cartridge 234 abuts against the positioning pin A 242 and the positioning pin B 243 and is stopped thereby. Simultaneously, the loading mechanism 240 is lowered, and the cartridge 234 is also lowered by virtue of the L-shaped end portions 240a, thereby being united with the driving device 235 into one body.

When the cartridge 234 is inserted, the end portions 240b of the loading mechanism 240 slide the shutter mechanism 241 in the opposite direction to the direction of cartridge insertion in correspondence with the amount of horizontal movement of the cartridge 234. As a result, the shuttering mechanism 241 exposes a part of the actuator 225 in the vicinity of the moving magnet 233 and a part of the spindle 232 in the vicinity of the bottom portion of the rotor 251, both of which have been covered by the shutter mechanism 241 on the base 210, and the connector B 245, as shown in FIG. 3A.

In this way, the cartridge 234 is united with the driving device 235 into one body with the bottom portion of the rotor 251 of the spindle 232 facing the spindle motor driving mechanism 236, and the magnetic poles of the pair of magnets 256 of the moving magnet 233 facing the actuator driving mechanism 237. In this state, the connector A 244 of the driving mechanism 235 comes into contact with the connector B 245 of the cartridge 234 and they are electrically connected with each other. When a command such as writing and reading is transmitted from the system to the driving device 235 through the system connector 246, a current flows to the spindle driving mechanism 236 in accordance with the command, so that the spindle 232 is rotated by the electromagnetic induction produced between the spindle driving mechanism 236 and the rotor 251.

When the number of revolutions of the spindle 232 reaches a stationary number of revolutions and the spindle 232 rotates normally, a control current flows to the actuator driving mechanism 237, and the electromagnetic induction by a magnetic circuit constituted by the actuator driving mechanism 237 and the moving magnet 233 produces the force for moving the moving magnet 233. As a result, the actuator 225 with the suspension 224 mounted on the ramp loading mechanism 229 rotates around the pivot 226, so that the suspension 224 leaves the ramp loading mechanism 229 and the magnetic head 223 moves to the outer periphery of the recording medium 222 while floating thereabove at a slight height.

In this state, it is possible to rock the actuator 225 by varying the direction of the current flow, and it is possible to position the magnetic head 223 at a desired position on the recording medium 222 for the writing/reading operation by controlling the amount of current. The write/read signal is transmitted to the connector A 244 through the FPC 208, and to the connector B 245 which is electrically connected to the connector A 244. The signal is then subjected to a predetermined processing by the printed circuit board 214 provided on the bottom portion of the driving device 235 and transmitted to the system through the system connector 246.

The operation of removing the cartridge 234 from the driving device 235 after the end of a predetermined operation will now be explained. When the push button 213 is pressed, the loading mechanism 240 is raised and the cartridge 234 is also raised therewith. The connecter A 244 is separated from the connector B 245, whereby the bottom portion of the rotor 251 of the spindle 232 is moved from position which faces the spindle motor driving mechanism 236 and the magnetic poles of the pair of magnets 256 of the moving magnet 233 are moved from the position which faces the actuator driving mechanism 237. In this state, it is possible to remove the cartridge 234 from the driving device 235.

When the cartridge 234 is drawn, the shutter mechanism 241 slides in the opposite direction to the direction of cartridge removal in correspondence with the amount of horizontal movement of the cartridge 234. The shutter mechanism 241 thus covers the part of the actuator 225 in the vicinity of the moving magnet 233, the part of the spindle 232 in the vicinity of the bottom portion of the rotor 251, and further the connector B 245, as shown in FIG. 3B.

The operation of the actuator 225 at the time of removing the cartridge 234 will here be explained. When the power source of the driving device 235 is turned OFF and the push button 213 is pressed so as to remove the cartridge 234, the charges on a capacitor or the like which is provided on the printed circuit board 214 flow to the coil 257 the moment the power source is turned OFF, and the force produced by the electromagnetic induction acts on the coil 257. The actuator 225 then rotates around the pivot 226, and the magnetic head 223 moves toward the outer periphery of the recording medium 222 until it is stopped when the suspension 224 is mounted on the ramp loading mechanism 229. In this way, the magnetic head 223 is kept outside of the recording medium 222.

If the push button 213 is pressed while the power source is ON, since the loading mechanism 240 is raised, as described above, the cartridge 234 is also raised with the loading mechanism 240 and the connecter A 244 is separated from the connector B 245, the recording medium 222 keeps on rotating a little while together with the spindle 232 by the inertia.

During this time, the magnetic head 223 is floating above the recording medium 222 although the floating height is reduced in proportion to the reduction in the rotational speed. When the cartridge 234 is drawn, the retracting cam A 253 which has been restrained from rotating by the positioning pin B 243 rotates and the retracting cam B 254 which rotates with the rotation of the retracting cam A 253 abuts against the moving magnet 233 and pushes it away. As a result, the actuator 225 rotates and the magnetic head 223 moves toward the outer periphery of the recording medium 222 until it is stopped when the suspension 224 is mounted on the ramp loading mechanism 229.

In this way, the magnetic head 223 is kept outside of the recording medium 222. It goes without saying that since the retracting cam A 253 is restrained from rotating by the positioning pin B 243 and the retracting cam B 254 is kept away from the rocking range of the moving magnet 233 while the cartridge 234 is inserted, neither the retracting cam A 253 nor the retracting cam B 254 obstructs the rocking movement of the actuator 225. In this way, in the cartridge 234 removed from the driving device 235, the magnetic head 223 is constantly kept outside of the recording medium 222 and even if vibration or a shock is applied to the cartridge 234, the recording medium 222 is precluded from the possibility of being damaged due to the tapping of the magnetic head 223.

In the base 210, the vicinity of the moving magnet 233 and the vicinity of the rotor 251 of the spindle 232 are composed of a nonmagnetic material and the other portion is made of a magnetic shielding material. In addition, in the cartridge 234 which is removed from the driving device 235, the portions of the nonmagnetic material in the vicinity of the moving magnet 233 and in the vicinity of the rotor 251 of the spindle 232 of the base 210 are covered with the shutter mechanism 241 composed of a magnetic shielding material. Accordingly, there is no fear of the information written on the recording medium 222 being damaged due to external influence.

Figure 6:
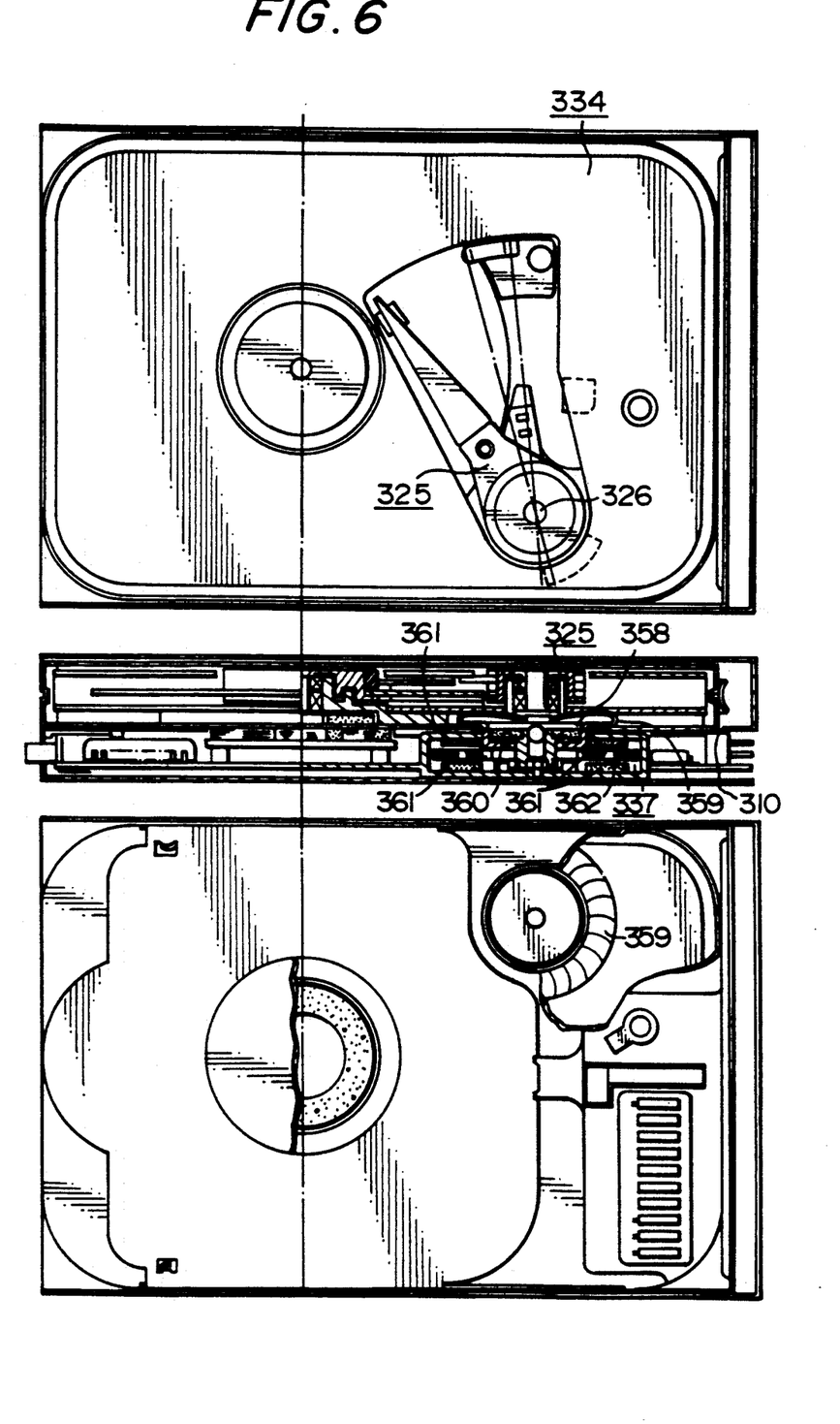
FIG. 6 shows another embodiment of a magnetic disk drive according to the present invention.
Figure 7:
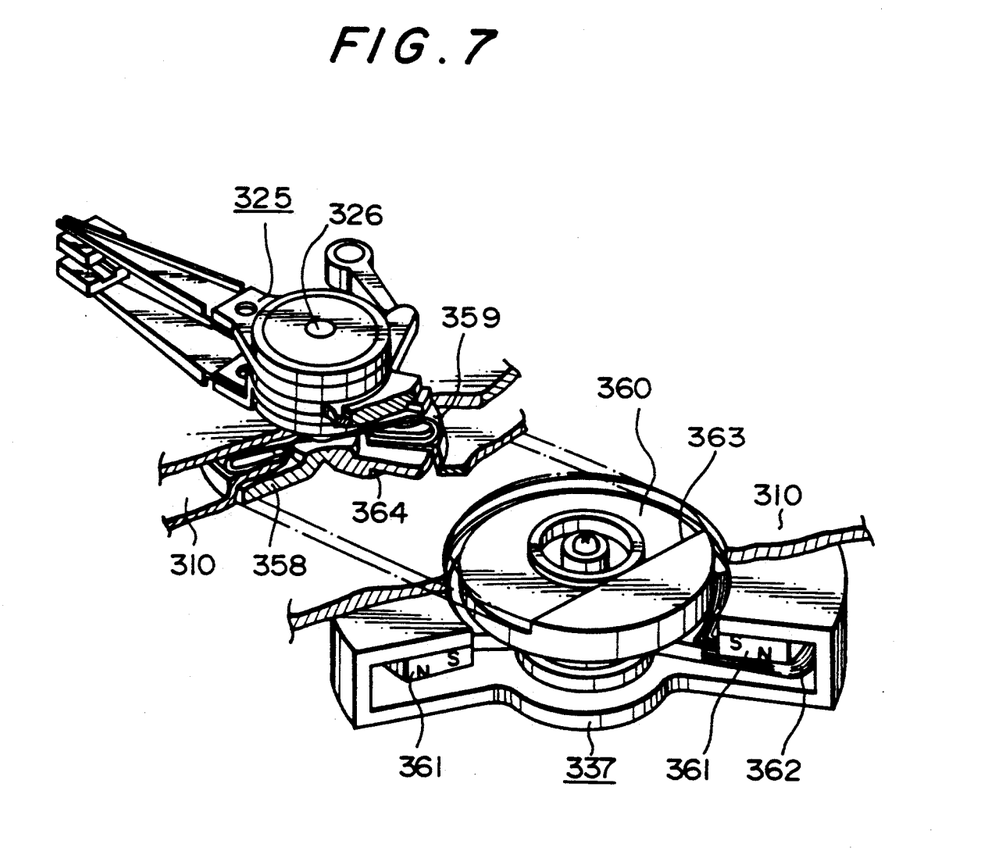
FIG. 7 is a perspective view of the actuator and the actuator driving portion in a conventional magnetic disk drive shown in FIG. 8.

Although the moving magnet 233 and the actuator driving mechanism 237 are coupled in a non-contacting state by electromagnetic induction in order to rock the actuator 225 in this embodiment, they may be coupled in a contacting state as in another embodiment shown in FIGS. 6 and 7.

In this embodiment, a turntable 358 composed of a magnetic material is attached to one end of a pivot 326. An elastic thin-film seal which is deformable in the rotational direction of the pivot 326 so as not to obstruct the rocking movement of the pivot 326 is provided between the pivot 326 and a base 310. An actuator driving mechanism 337 is provided with a coupling member 360 composed of a magnet in such a manner as to be removably coupled with the turntable 358. The actuator driving mechanism 337 is composed of magnets 361 and a coil 362 so as to rotate the coupling member 360.

In this structure, when a cartridge 334 is inserted into a driving mechanism, the coupling member 360 is magnetically coupled with the turntable 358 into one body while rotating such that the end surface of a notched portion 364 provided on the turntable 358 of an actuator 325 shown in FIG. 7 abuts against the end surface of a notched portion 363 provided on the coupling member 360. Consequently, the actuator 325 to which the driving force of the actuator driving mechanism 337 is transmitted is rocked. At this time, the elastic thin-film seal 359 repeats clockwise or counterclockwise deformation in correspondence with the rotation or reverse rotation of the turntable 358. Thus, this embodiment has similar advantages to those of the first embodiment.

As described above, according to the present invention, since the spindle, the magnetic head and the like are enclosed in the cartridge in a sealed state, the non-uniformity in the chucking accuracy of the spindle is suppressed, the azimuth error is suppressed and the cartridge is unsusceptible to dust, so that the recording density is enhanced. As a result, a small-sized magnetic disk apparatus which has higher reliability and a higher recording density is realized at a low cost while maintaining easiness in handling. In addition, since the number of elements which are to be disposed in the cartridge in a sealed state is small, it is also possible to reduce the size of the cartridge in this respect.

According to the present invention, when the cartridge is removed from the driving device, the suspension is mounted on the ramp loading mechanism, so that even if a shock is applied to the cartridge from the outside, the cartridge can withstand the shock sufficiently. Accordingly, the cartridge is easy to handle.

In the present invention, the actuator and the actuator driving mechanism may be coupled either in a contacting state or in a non-contacting state.

If the shutter mechanism is composed of a magnetic shielding material or if the surface of the cartridge except the surface which faces the spindle driving mechanism and the actuator driving mechanism is covered with a magnetic shielding material, the resistance to noise of the cartridge is improved.

Furthermore, if the surface of the cartridge which faces the spindle driving mechanism and the actuator driving mechanism is covered with a nonmagnetic material when the shutter mechanism is closed, the effect on the reduction in size and the enhancement of reliability is more prominent. If a connecting mechanism such as a connector is provided both on the cartridge and on the driving device, the mounting and removal of the cartridge on and from the driving device are facilitated. If a buffer material is disposed on the outer peripheral portion of the cartridge, the ingress of dust is prevented and the shock resistance is improved, which realizes greater reduction in size and enhancement of reliability.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A magnetic disk drive comprises:
   A) a cartridge including:
   a) a planar magnetic recording medium;
   b) a spindle fixed to a central part of the magnetic recording medium;
   c) a magnetic head which is fixed to an actuator and which magnetically writes information on the magnetic recording medium and reads the information written on the magnetic recording medium;

d) the actuator which supports the magnetic head at one end thereof and which rocks around a pivot in a plane parallel to a recording surface of the recording medium; and e) a shutter mechanism which is closed so as to accommodate the magnetic recording medium, spindle, magnetic head and actuator in the cartridge in a sealed state and which is opened so as to expose at least a part of the spindle and the actuator in an unsealed state; and B) a driving device including:

f) a loading mechanism for mounting the cartridge on the driving device while opening the shutter mechanism and for removing the cartridge while closing the shutter mechanism;

g) a spindle driving mechanism for rotating the magnetic recording medium by rotating the spindle in the unsealed state in which the cartridge is mounted; and h) an actuator driving mechanism for moving the position of the magnetic head by rocking the actuator in the unsealed state in which the cartridge is mounted.

2. A magnetic disk drive according to claim 1, wherein the shutter mechanism is composed of a magnetic shielding material.

3. A magnetic disk drive according to claim 1, wherein a surface of the cartridge except a surface which faces the spindle driving mechanism and the actuator driving mechanism is covered with a magnetic shielding material.

4. A magnetic disk drive according to claim 1, the cartridge further includes a means for covering a surface which faces the spindle driving mechanism and the actuator driving mechanism with a nonmagnetic material when the shutter mechanism is closed.

5. A magnetic disk drive according to claim 1, wherein the cartridge further includes a cartridge connecting mechanism for fetching driving currents for driving the spindle and the actuator, respectively, from a driving circuit and transmitting and receiving an electric signal between the magnetic head and the driving circuit; and the driving device further includes a driving device connecting mechanism which is connected to the cartridge connecting mechanism and which is separated from the cartridge connecting mechanism when the cartridge is removed from the driving device.

6. A magnetic disk drive according to claim 1, wherein the cartridge further includes;

a case which is composed of a base and a cover and which constitutes an outer frame of the cartridge;

a subbase for fixing the spindle and the pivot of the actuator;

a subplate which is supported by the subbase and which covers the magnetic recording medium; and a buffer material with which a gap between the subbase and an inner wall of the case and a gap between the subplate and the inner wall of the case are filled.

7. A magnetic disk drive comprising:

A) a cartridge including:

a) a planar magnetic recording medium;

b) a spindle fixed to a central part of the magnetic recording medium;

c) a magnetic head which is fixed to an actuator through a suspension and which magnetically writes information on the magnetic recording medium and reads the information recorded on the magnetic recording medium; the suspension being a leaf spring with one end being fixed to the actuator and the other end supporting the magnetic head in such a manner as to enable the magnetic head to be pushed up vertically relative to the actuator;

d) the actuator which supports the magnetic head at one end thereof and which rocks around a pivot in a plane parallel to a recording surface of the recording medium;

e) a shutter mechanism which is closed so as to accommodate the magnetic recording medium, spindle, magnetic head and actuator in the cartridge in a sealed state and which is opened so as to expose at least a part of the spindle and the actuator in an unsealed state;

f) a means for moving the magnetic head outside of the recording surface of the magnetic recording medium in a plane which is parallel to the recording surface of the magnetic recording medium by rotating the actuator when the shutter mechanism is closed;

g) a retracting cam for pushing up the suspension when the shutter mechanism is closed; and h) a ramp loading mechanism for receiving the suspension and holding the vertical position of the magnetic head when the magnetic head moves outside of the recording surface of the magnetic recording medium and the suspension is pushed up; and B) a driving device including:

i) a loading mechanism for mounting the cartridge on the driving device while opening the shutter mechanism and for removing the cartridge while closing the shutter mechanism;

j) a spindle driving mechanism for rotating the magnetic recording medium by rotating the spindle in the unsealed state in which the cartridge is mounted; and k) an actuator driving mechanism for moving the position of the magnetic head by rocking the actuator in the unsealed state in which the cartridge is mounted.

8. A magnetic disk drive according to claim 7, wherein the shutter mechanism is composed of a magnetic shielding material.

9. A magnetic disk drive according to claim 7, wherein a surface of the cartridge except a surface which faces the spindle driving mechanism and the actuator driving mechanism is covered with a magnetic shielding material.

10. A magnetic disk drive according to claim 7, the cartridge further includes a means for covering a surface which faces the spindle driving mechanism and the actuator driving mechanism with a nonmagnetic material when the shutter mechanism is closed.

11. A magnetic disk drive according to claim 7, wherein the cartridge further includes a cartridge connecting mechanism for fetching driving currents for driving the spindle and the actuator, respectively, from a driving circuit and transmitting and receiving an electric signal between the magnetic head and the driving circuit; and the driving device further includes a driving device connecting mechanism which is connected to the cartridge connecting mechanism and which is separated from the cartridge connecting mechanism when the cartridge is removed from the driving device.

12. A magnetic disk drive according to claim 7, wherein the cartridge further includes:
   a case which is composed of a base and a cover and which constitutes an outer frame of the cartridge;
   a subbase for fixing the spindle and the pivot of the actuator;
   a subplate which is supported by the subbase and which covers the magnetic recording medium; and
   a buffer material with which a gap between the subbase and an inner wall of the case and a gap between the subplate and the inner wall of the case are filled.

13. A magnetic disk drive comprising:
A) a cartridge including:
   a) a planar magnetic recording medium;
   b) a spindle fixed to a central part of the magnetic recording medium;
   c) a magnetic head which is fixed to an actuator and which magnetically writes information written on the magnetic recording medium;
   d) the actuator which supports the magnetic head at one end thereof and which rocks around a pivot in a plane parallel to a recording surface of the recording medium;
   e) a shutter mechanism which is closed so as to accommodate the magnetic recording medium, spindle, magnetic head and actuator in the cartridge in a sealed state and which is opened so as to expose at least the spindle and the pivot in an unsealed state; and
   f) an elastic thin-film seal which is an annular member composed of a plurality of scale-like pieces so as to cover a peripheral edge of the exposed pivot, which is deformed by a rotational force around the pivot and which absorbs the rotational force by deformation and seals at least the peripheral edge of the exposed pivot; and
B) a driving device including:
   g) a loading mechanism for mounting the cartridge on the driving device while opening the shutter mechanism and for removing the cartridge while closing the shutter mechanism;
   h) a spindle driving mechanism for rotating the magnetic recording medium by rotating the spindle in the unsealed state in which the cartridge is mounted;
   i) an actuator driving mechanism for moving the position of the magnetic head by rocking the actuator in the unsealed state in which the cartridge is mounted;
   j) a turntable opposed to one end of the pivot in such a manner as to seal the exposed pivot in an axial direction when the cartridge is mounted on the driving device and the shutter mechanism is open; and
   k) a coupling member engaged with the turntable so as to transmit rotational force of the actuator driving mechanism and rotate the turntable.

14. A magnetic disk drive according to claim 13, wherein the cartridge further includes:
   a suspension which is a leaf spring with one end being fixed to the actuator and the other end supporting the magnetic head in such a manner as to enable the magnetic head to be pushed up vertically relative to the actuator;
   a means for moving the magnetic head outside of the recording surface of the magnetic recording medium in a plane which is parallel to the recording surface of the magnetic recording medium by rotating the actuator when the shutter mechanism is closed;
   a retracting cam for pushing up the suspension when the shutter mechanism is closed; and
   a ramp loading mechanism for receiving the suspension and holding the vertical position of the magnetic head when the magnetic head moves outside of the recording surface of the magnetic recording medium and the suspension is pushed up.

15. A magnetic disk drive according to claim 13, wherein the shutter mechanism is composed of a magnetic shielding material.

16. A magnetic disk drive according to claim 13, wherein a surface of the cartridge except a surface which faces the spindle driving mechanism and the actuator driving mechanism is covered with a magnetic shielding material.

17. A magnetic disk drive according to claim 13, the cartridge further includes a means for covering a surface which faces the spindle driving mechanism and the actuator driving mechanism with a nonmagnetic material when the shutter mechanism is closed.

18. A magnetic disk drive according to claim 13, wherein the cartridge further includes a cartridge connecting mechanism for fetching driving currents for driving the spindle and the actuator, respectively, from a driving circuit and transmitting and receiving an electric signal between the magnetic head and the driving circuit; and the driving device further includes a driving device connecting mechanism which is connected to the cartridge connecting mechanism and which is separated from the cartridge connecting mechanism when the cartridge is removed from the driving device.

19. A magnetic disk drive according to claim 13, wherein the cartridge further includes;
   a case which is composed of a base and a cover and which constitutes an outer frame of the cartridge;
   a subbase for fixing the spindle and the pivot of the actuator;
   a subplate which is supported by the subbase and which covers the magnetic recording medium; and
   a buffer material with which a gap between the subbase and an inner wall of the case and a gap between the subplate and the inner wall of the case are filled.

* * * * *